United States Patent
Lang et al.

(10) Patent No.: US 10,316,942 B2
(45) Date of Patent: Jun. 11, 2019

(54) SUPPORTING BODY COMPRISING A RECEIVING GROOVE FOR A REINFORCEMENT PANEL

(71) Applicant: Schaeffler Technologies AG & Co. KG, Herzogenaurach (DE)

(72) Inventors: Johannes Lang, Lonnerstadt (DE); Joerg-Dietrich Krohmer, Grosenseebach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 187 days.

(21) Appl. No.: 15/322,381

(22) PCT Filed: Apr. 30, 2015

(86) PCT No.: PCT/DE2015/200291
§ 371 (c)(1),
(2) Date: Dec. 27, 2016

(87) PCT Pub. No.: WO2016/000702
PCT Pub. Date: Jan. 7, 2016

(65) Prior Publication Data
US 2017/0138442 A1    May 18, 2017

(30) Foreign Application Priority Data
Jul. 2, 2014    (DE) .................... 10 2014 212 757

(51) Int. Cl.
*F16H 7/08* (2006.01)
*F16H 7/18* (2006.01)

(52) U.S. Cl.
CPC ............... *F16H 7/08* (2013.01); *F16H 7/18* (2013.01); *F16H 2007/0872* (2013.01); *F16H 2007/185* (2013.01)

(58) Field of Classification Search
CPC ...... F16H 7/08; F16H 7/18; F16H 2007/0872; F16H 2007/185
See application file for complete search history.

(56) References Cited

U.S. PATENT DOCUMENTS 5,045,032 A    9/1991  Suzuki et al.
6,612,952 B1 *  9/2003  Simpson .................. F16H 7/08
                                                    474/111
(Continued)

FOREIGN PATENT DOCUMENTS

CN    102282391 A    12/2011
CN    102734408 A    10/2012
(Continued)

*Primary Examiner* — Michael R Mansen
*Assistant Examiner* — Robert T Reese
(74) *Attorney, Agent, or Firm* — Davidson, Davidson & Kappel, LLC

(57) ABSTRACT

A supporting body (1) for guiding or tensioning a circumferential traction mechanism of a traction drive, a front side (12) that has an elongated sliding surface for making contact with the traction mechanism, a rear side (2) that lies opposite and includes an elongated receiving groove (5) for form-fittingly receiving a reinforcement panel, the receiving groove (5) being formed by delimiting elements (3) which protrude, at the sides of the groove, from the rear side, and at least two delimiting elements (3, 3') on one side of the receiving groove (5) being separated in the longitudinal direction by a spacing in the form of a gap (4).

13 Claims, 1 Drawing Sheet

(56) References Cited

U.S. PATENT DOCUMENTS

| | | | |
|---|---|---|---|
| 6,843,742 B2 | 1/2005 | Konno | |
| 8,690,717 B2 | 4/2014 | Fuhrmann et al. | |
| 2002/0198073 A1* | 12/2002 | Takeda | F16H 7/08 474/111 |
| 2003/0134704 A1 | 7/2003 | Konno et al. | |
| 2015/0369345 A1* | 12/2015 | Lindner | F16H 7/08 474/111 |
| 2016/0069432 A1* | 3/2016 | Wach | F16H 7/18 474/111 |

FOREIGN PATENT DOCUMENTS

| | | |
|---|---|---|
| DE | 103 01 428 B4 | 4/2009 |
| DE | 102009023825 A1 | 12/2010 |
| EP | 1096173 | 5/2001 |
| EP | 1258656 | 11/2002 |
| JP | 2001108031 | 4/2001 |
| JP | 2001311457 | 11/2001 |
| JP | 2002070965 | 3/2002 |

\* cited by examiner

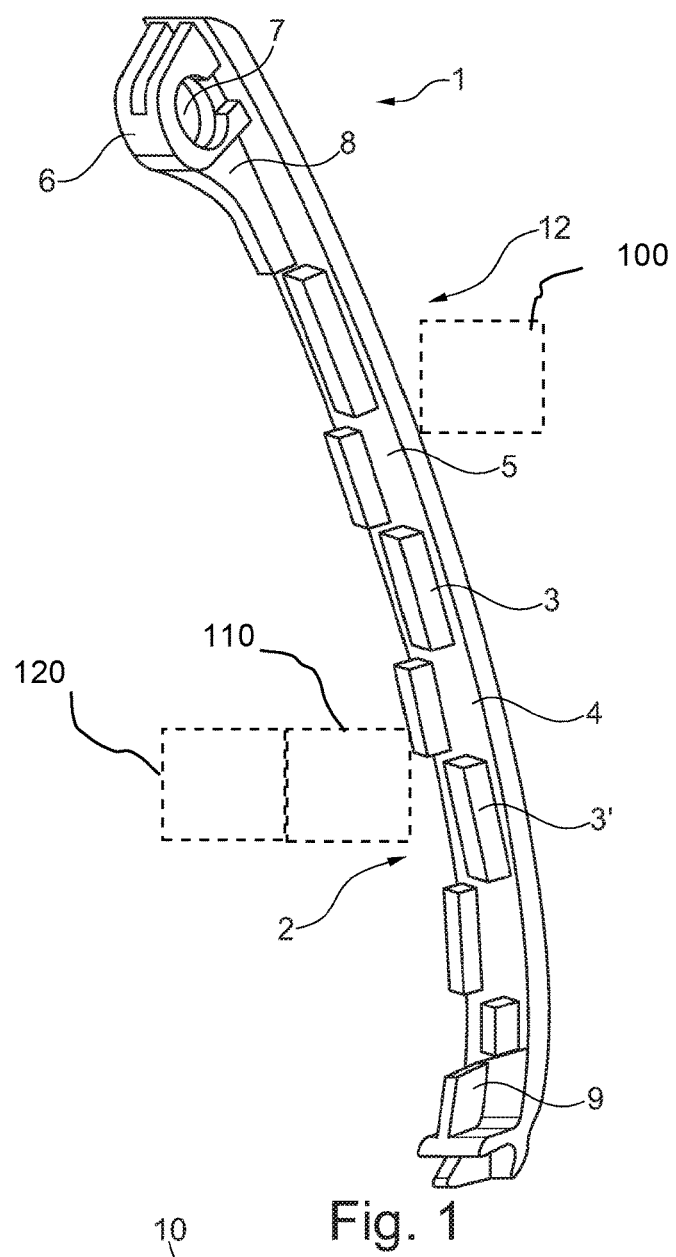
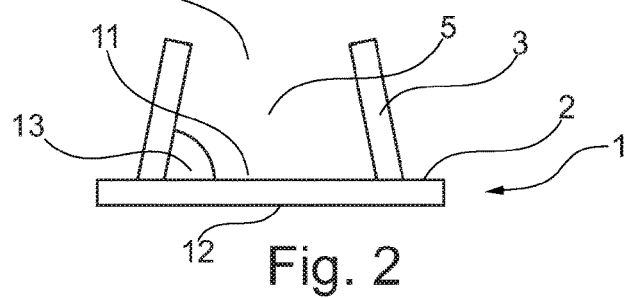

SUPPORTING BODY COMPRISING A RECEIVING GROOVE FOR A REINFORCEMENT PANEL

The present invention relates to a supporting body for guiding or tensioning a circumferential traction mechanism of a traction mechanism drive, including a front side which has a longitudinal sliding surface for contact with the traction mechanism, a diametrically opposed rear side which has an elongated receiving groove for the form-fitting accommodation of a reinforcement panel, the receiving groove being formed by delimiting elements which protrude, at sides of the groove, from the rear side.

The field of use of the present invention extends to traction mechanism drives in which torque or kinetic energy is to be transmitted from a first shaft to a second shaft with the aid of a circumferential traction mechanism. To limit the degrees of freedom of the movement of the circumferential traction mechanism, guide rails and tensioning rails are used in the known prior art, guide rails being fixedly connected all over to the bearing of the shafts, and tensioning rails being swivel-mounted on the bearing, a pressure means being provided which presses the tensioning rail dynamically against the traction mechanism for the purpose of holding the latter under tension. Great forces, which may bend or otherwise structurally damage tensioning or guide rails manufactured from plastic, for example by injection molding, thus occasionally occur, particularly in tensioning rails but also in guide rails. To structurally reinforce the deformable base body of the tensioning or guide rail, a reinforcement panel is therefore provided, which is inserted, in parallel to the running direction of the traction mechanism, into an opening opposite the contact surface of the tensioning rail and traction mechanism. This receiving groove should neither be too large, since the reinforcement panel may thus, for example, vibrate or fall out of the receiving groove, nor be too narrowly dimensioned, since the insertion of the reinforcement panel is then made more difficult or impossible.

To solve this problem, a guide is presented in DE 103 01 428 B4, which includes a receiving groove for accommodating a reinforcement panel, multiple ribs running perpendicularly to the longitudinal direction of the receiving groove being arranged on the inside of the receiving groove, with the aid of which the inaccuracies or planned tolerances during the manufacture of the receiving groove or the reinforcement panel may be compensated for. The disadvantage thereof is, in particular, the increased manufacturing complexity of this approach.

SUMMARY OF THE INVENTION

It is an object of the present invention to provide a supporting body, which may be used as a tensioning or guide rail of a traction mechanism drive, which easily permits the accommodation of a reinforcement panel.

The present invention covers the technical teaching that at least two delimiting elements on one side of the receiving groove are separated in the longitudinal direction by a spacing in the form of a gap.

The advantage of this teaching is, for example, that material and costs may be saved during manufacture by the spacing or gap between the two delimiting elements, the supporting body having a lower weight than in the prior art.

Another advantage is that, due to multiple gaps of this type, the delimiting elements on both sides of the receiving groove have a greater mechanical deformability in the lateral direction, due to which inaccuracies or planned manufacturing tolerances of the receiving groove or reinforcement plant may be compensated for.

The supporting body and reinforcement panel are preferably designed in such a way that they are suitable, in particular, as the guide rail or tensioning rail of a traction mechanism drive. For example, a guide rail typically includes two fastening elements for bolts or screw connections on the traction mechanism drive, for example, while a tensioning rail typically includes a receptacle for the swiveling support on, for example, a bolt on the traction mechanism drive, while the reinforcement panel used in the supporting body has a contact surface for a pressure means fastened to the traction mechanism drive, for example a pressure spring or a hydraulic pressure means.

The supporting body is advantageously manufactured as a single piece by injection molding, which simplifies the manufacturing process.

According to one advantageous refinement of the present invention, multiple delimiting elements are provided on both sides of the elongated receiving groove, which thus define the receiving groove in the manner of laterally arranged crenellations. The advantage of this approach is that the dimensions and positions of the delimiting elements may be variably configured to increase, for example, the mechanical load capacity.

According to one advantageous refinement of the present invention, each gap between two delimiting elements on one side of the receiving groove is situated opposite a delimiting element on the other side. This results in a gap-free projection in a lateral projection of the delimiting elements on both sides, which increases the mechanical load capacity.

In another improvement of this specific embodiment, each delimiting element on one side, except for the first and the last delimiting elements viewed in the longitudinal direction, is situated opposite a gap on the other side, which has the same dimensions as this delimiting element. As in the last specific embodiment, this results in a continuously gap-free projection, in which the delimiting elements are additionally alternatingly arranged, in which no overlaps furthermore occur in the projection. Additional material is saved thereby while maintaining the same mechanical stability.

According to one measure which improves the present invention, one or multiple, preferably all, delimiting elements are bent or tilted in the direction of the receiving groove, so that, in the vicinity of the rear side of the supporting body, they are situated a greater distance from each other than from the supporting body. This results in a width tolerance of the reinforcement panel or the receiving groove.

BRIEF DESCRIPTION OF THE DRAWINGS

Additional measures which improve the present invention are illustrated in greater detail below, together with the description of two preferred exemplary embodiments of the present invention.

FIG. 1 shows a perspective view of the schematic representation of a supporting body according to the present invention; and FIG. 2 shows a sectional view of another exemplary embodiment of a supporting body according to the present invention.

DETAILED DESCRIPTION

According to FIG. 1, an elongated supporting body 1 has a rear side 2, on which delimiting elements 3 are alternatingly arranged. In this case, alternating means that one gap 4 is situated longitudinally between each of two delimiting elements 3, the one delimiting element 3 on the other side being opposite elongated receiving groove 5 formed by delimiting elements 3. A receiving element 6, which has a circular recess 7 for accommodating a bolt of a traction mechanism drive 100, illustrated schematically, for the purpose of the swiveling support of the supporting body, is also arranged on rear side 2. Along the longitudinal direction of supporting body 1, delimiting elements 3 form receiving groove 5 for accommodating a reinforcement panel 110 illustrated schematically and pressured by a pressure means 120, also schematically illustrated. Delimiting elements 3 are arranged in such a way that one delimiting element 3, except for first delimiting element 8 and last delimiting element 9 in the longitudinal direction, is always situated precisely congruently opposite one gap 4 between two delimiting elements 3 arranged on the other side of receiving groove 5. Due to a construction of this type, material and weight are saved without essentially influencing the mechanical load capacity, since the latter arises primarily due to the reinforcement panel, which is not illustrated.

The cross section of another supporting body 1 according to the present invention is apparent in FIG. 2, in which delimiting elements 3 are arranged in a not strictly alternating manner. The cross-sectional plane intersects elongated supporting body 1 perpendicularly at a point at which delimiting elements 3 are present on both sides of receiving groove 5. It is apparent herein how delimiting elements 3 are positioned at an angle 13 of less than 90° on rear side 2 opposite front side 12, whereby receiving groove 5 narrows as the distance from rear side 2 increases. For example, a reinforcement panel, which is not illustrated in FIG. 2, may thus be accommodated here, the reinforcement panel having a thickness which is wider than distal end 10 of receiving groove 5 and narrower than proximal end 11 of receiving groove 5.

The present invention is not limited to the exemplary embodiment described above. Modifications thereof are also possible, which are covered by the following claims. It is thus possible, for example, that the individual delimiting elements are provided with a cylindrical design and not a cuboid design, as shown here.

LIST OF REFERENCE NUMERALS 1 supporting body
2 rear side of the supporting body
3, 3' delimiting element
4 gap
5 receiving groove
6 receiving element
7 circular recess
8 first delimiting element
9 last delimiting element
10 distal end of the receiving groove
11 proximal end of the receiving groove
12 front side of the supporting body
13 angle

What is claimed is:

1. A supporting body for guiding or tensioning a circumferential traction mechanism of a traction mechanism drive, comprising:
a front side having an elongated sliding surface for contact with the traction mechanism;
a diametrically opposed rear side having an elongated receiving groove for a form-fitting accommodation of a reinforcement panel, the receiving groove being formed by delimiting elements protruding, at sides of the groove, from the rear side, the delimiting elements including first delimiting elements on a first side of the groove and second delimiting elements on a second side of the groove;
at least two of the first delimiting elements being separated in a longitudinal direction by a spacing in the form of a first gap, at least two of the second delimiting elements being separated in the longitudinal direction by a spacing in the form of a second gap,
one of the first delimiting elements being situated congruently opposite the second gap.

2. The supporting body as recited in claim 1 wherein the supporting body is designed as a guide rail for guiding the traction mechanism.

3. The supporting body as recited in claim 1 wherein the supporting body is designed as a tensioning rail for tensioning the traction mechanism by applying pressure to the reinforcement panel with the aid of a pressure means.

4. The supporting body as recited in claim 1 wherein the supporting body is manufactured as a single piece by injection molding.

5. The supporting body as recited in claim 1 wherein more than two of the first delimiting elements are provided on the first side of the receiving groove.

6. The supporting body as recited in claim 5 wherein each of the first gaps between two of the first delimiting elements on the first side is situated opposite one of the second delimiting elements on the second side.

7. The supporting body as recited in claim 6 wherein one of the second delimiting elements on the second side is longitudinally adjacent to two further of the second delimiting elements and is situated opposite one of the first gaps of a same length between the two first delimiting elements.

8. The supporting body as recited in claim 1 wherein the receiving groove formed by the delimiting elements tapers as the distance from the supporting body increases.

9. The supporting body as recited in claim 8 wherein an angle between a receiving groove-side wall of at least one of the delimiting element and the rear side of the supporting body is less than 90° in a sectional plane perpendicular to the longitudinal direction.

10. The supporting body as recited in claim 1 wherein one of the second delimiting elements is situated congruently opposite the first gap.

11. A supporting body for guiding or tensioning a circumferential traction mechanism of a traction mechanism drive, comprising:
a front side having an elongated sliding surface for contact with the traction mechanism;
a diametrically opposed rear side having an elongated receiving groove for the form-fitting accommodation of a reinforcement panel, the receiving groove being formed by delimiting elements protruding, at sides of the groove, from the rear side;
at least two delimiting elements on one side of the receiving groove being separated in the longitudinal direction by a spacing in the form of a gap,
a receiving groove-side wall of at least one of the delimiting element extending from the rear side of the supporting body at an angle that is less than 90° in a sectional plane perpendicular to a longitudinal direction of the receiving groove.

12. A supporting body for guiding or tensioning a circumferential traction mechanism of a traction mechanism drive, comprising:

a front side having an elongated sliding surface for contact with the traction mechanism;

a diametrically opposed rear side having an elongated receiving groove for the form-fitting accommodation of a reinforcement panel, the receiving groove being formed by delimiting elements protruding, at sides of the groove, from the rear side;

the delimiting elements including at least two first delimiting elements on a first side of the groove and at least two second delimiting elements on a second side of the groove;

at least two of the first delimiting elements being separated in a longitudinal direction by a spacing in the form of a first gap, at least two of the second delimiting elements being separated in the longitudinal direction by a spacing in the form of a second gap, each of the first delimiting elements and the second delimiting elements having the same shape, and one of the first delimiting elements being situated congruently opposite the second gap.

13. The supporting body as recited in claim 12 wherein the same shape is a cuboid shape.

\* \* \* \* \*